United States Patent
Stonick et al.

(10) Patent No.: US 7,260,155 B2
(45) Date of Patent: Aug. 21, 2007

(54) METHOD AND APPARATUS FOR ENCODING AND DECODING DIGITAL COMMUNICATIONS DATA

(75) Inventors: John T. Stonick, Portland, OR (US); James Gorecki, Hillsboro, OR (US); William S. Check, Jr., Beaverton, OR (US); Shawn Searles, Beaverton, OR (US)

(73) Assignee: Synopsys, Inc., Mountain View, CA (US)

( * ) Notice: Subject to any disclaimer, the term of this patent is extended or adjusted under 35 U.S.C. 154(b) by 687 days.

(21) Appl. No.: 10/222,254

(22) Filed: Aug. 16, 2002

(65) Prior Publication Data

US 2003/0108134 A1 Jun. 12, 2003

Related U.S. Application Data

(60) Provisional application No. 60/313,476, filed on Aug. 20, 2001, provisional application No. 60/313,214, filed on Aug. 17, 2001.

(51) Int. Cl.
*H04L 25/34* (2006.01)
*H04L 25/49* (2006.01)
*H03K 7/02* (2006.01)

(52) U.S. Cl. .................... 375/292; 375/353

(58) Field of Classification Search ............... 375/286, 375/292, 353
See application file for complete search history.

(56) References Cited

U.S. PATENT DOCUMENTS 4,562,426 A    12/1985 Forney
5,784,409 A *   7/1998 Coles ..................... 375/286
5,917,814 A *   6/1999 Balatoni .................. 370/352
6,052,390 A     4/2000 Deliot et al.
6,772,351 B1 *  8/2004 Werner et al. ............ 713/300

OTHER PUBLICATIONS

Griffiths, J.M., "Binary Code Suitable For Line Transmission," Electronics Letters, IEE Stevenage, GB, vol. 5, No. 4, Feb. 20, 1969, pp. 79-81, ISSN: 0013-5194.

D. Pan and J.T. Stonick, "IC-Friendly Line Codes for Direct-Conversion Receivers," IEEE Radio and Wireless Conference 2000, Sep. 10, 20000-Sep. 13, 2000, pp. 47-50, ISBN: 0-7803-6267-5.

R. Farjad-Rad, C. Yang, M.A. Horowitz and T.H. Lee, "A 0.4-um CMOS 10-Gb/s 4-PAM Pre-Emphasis Serial Link Transmitter," IEEE Journal of Solid-State Circuits, May 1999, vol. 34, No. 5, pp. 580-585, ISSN: 0018-9200.

\* cited by examiner

*Primary Examiner*—David B. Lugo
(74) *Attorney, Agent, or Firm*—Park, Vaughan & Fleming, LLP (57) ABSTRACT

In one aspect, the present invention is a system and technique that provides for the systematic development or implementation of codes that increase the robustness of systems employing, for example, PAM-n transmission techniques. The system and technique of this aspect of the invention eliminate, minimize, reduce or limit transitions between extreme signaling levels. As a result, the slew rate employed and/or required by the transmitter may reduce crosstalk and intersymbol interference, and provide for wider "eye" openings from the perspective of the receiver.

14 Claims, 6 Drawing Sheets

METHOD AND APPARATUS FOR ENCODING AND DECODING DIGITAL COMMUNICATIONS DATA

CROSS-REFERENCE TO RELATED APPLICATIONS

This application claims priority to U.S. Provisional Patent Application Ser. No. 60/313,476, entitled "Method and Apparatus for Encoding and Decoding Digital Communications Data", filed Aug. 20, 2001 and U.S. Provisional Application Ser. No. 60/313,214, entitled "Transceiver Apparatus and Method", filed Aug. 17, 2001. The contents of these provisional applications are incorporated, in their entirety, by reference herein.

This application is related to U.S. Provisional Patent Application Ser. No. 60/313,454, entitled "Transceiver System for High Speed Digital Signaling", filed Aug. 20, 2001; U.S. Provisional Patent Application Ser. No. 60/313,455, entitled "Automatic Slicer Level Adaption", filed Aug. 20, 2001; U.S. Provisional Patent Application Ser. No. 60/313,456, entitled "Variable Rate Sub-Channel Using Block Code RDS", filed Aug. 20, 2001; U.S. Provisional Patent Application Ser. No. 60/313,478, entitled "Variable Delay FIR Equalizer for Serial Baseband Communications", filed Aug. 20, 2001; and U.S. Provisional Patent Application Ser. No. 60/313,477, entitled "Crosstalk Management for High-Speed Signaling Links", filed Aug. 20, 2001. The aforementioned provisional patent applications are hereby incorporated by reference herein.

This application is also related to non-provisional patent applications that claim priority to one or more of the above-referenced provisional patent applications. These non-provisional patent applications are entitled "System and Method for High Speed Digital Signaling", filed Aug. 16, 2002 (application Ser. No. 10/222,122); "System and Method for Providing Slicer Level Adaption", filed Aug. 16, 2002 (application Ser. No. 10/222,073); "System and Method for Embedding a Sub-Channel in a Block Coded Data Stream", filed Aug. 16, 2002 (application Ser. No. 10/222,071); "System and Method for Providing Variable Delay FIR Equalizer for Serial Baseband Communications", filed Aug. 16, 2002 (application Ser. No. 10/222,166); and "System and Method for Providing Crosstalk Management for High-Speed Signaling Links", filed Aug. 16, 2002 (application Ser. No. 10/222,072). The aforementioned applications are hereby incorporated by reference, in their entirety, herein.

BACKGROUND OF THE INVENTION

This application relates in general to a, method, apparatus, and article of manufacture for providing high speed digital communications through a communications channel, and more particularly to a method, apparatus, and article of manufacture for encoding and decoding digital communications data.

Digital communications channels are continuously increasing the transfer rate at which the data is transmitted between devices in order to meet the demand on communications systems. To meet that increase, conventional systems have employed various encoding and modulations techniques that attempt to meet that demand. One such technique is to encode user data into what are known as "Q Codes".

In order to further meet the increase in the demand of the transfer rate of data, conventional system also employ a multi-level pulse amplitude modulation (PAM-n) scheme that encodes a plurality of bits of data into or onto a signal in which the symbols are represented as a set of signal levels between a minimum and maximum set of signal levels. One advantage of utilizing multi-level PAM, as opposed to binary, is that fewer symbols per second need to be transmitted to convey a given number of bits per second. This reduces the frequency content of the transmitted signal.

A shortcoming of employing multi-level PAM signaling is a reduction in voltage margin. The reduction in voltage margin creates, among other things, the recovery or detection of the original signal more difficult and therefore recovery of the original symbol(s) more difficult. For example, detecting the level of a PAM-4 signaling technique requires discrimination between four levels rather than two levels in a binary signaling technique.

Moreover, while PAM-4 signaling allows for a two-fold reduction in the symbol rate for a given channel bit rate (relative to binary), systems employing PAM-4 tend to observe or experience a two-thirds smaller eye opening in terms of the voltage, and up to a two times larger eye opening in terms of the time domain relative to conventional binary signaling systems carrying the same aggregate bit rate. As such, nearly exact or precise equalization to a zero intersymbol interference pulse shape may be required to eliminate errors.

Further, systems employing PAM encoding techniques, for example, PAM-4, may experience signal transitions at the transmitter that traverse the spectrum of allowable signal levels. That is, a transition from the highest to lowest allowable signal levels, for example, transition from a signal level of +3 to a signal level of −3, may enhance the difficulty in recovery of the signals at the receiver because such transitions tend to narrow the "eye" openings from the perspective of the receiver.

In short, the present invention addresses, among other things, some or all of the shortcomings of communication systems employing PAM-n (for example, PAM-4) signaling techniques.

SUMMARY OF THE INVENTION

The present invention relates in general to a method, apparatus, and article of manufacture for providing high-speed digital communications through a communications channel.

In one aspect, the present invention is a system and technique that provides for the systematic development or implementation of codes that increase the robustness of systems employing, for example, PAM-n transmission techniques. The system and technique of this aspect of the invention eliminate, minimize, reduce or limit transitions between extreme signaling levels. As a result, the slew rate employed and/or required by the transmitter reduces crosstalk and intersymbol interference, and provides for wider "eye" openings at the receiver.

In addition, symbols that arise as a result of min-max-min or max-min-max signaling levels, which may be eliminated, minimized, reduced or limited in accordance with the present invention, tend to suffer significant impairment or degradation when transmitted through a band-limited communications channel. Thus, eliminating, reducing or restricting such symbol transitions may improve the "eye" opening from the perspective of the receiver.

It should be noted that although the invention is described in relation to a physical modulation scheme that is n-level PAM (e.g., PAM-4), many other modulation techniques or schemes may be employed. Indeed, all types of modulation or encoding schemes, whether now known or later developed, are intended to be within the scope of the present invention.

BRIEF DESCRIPTION OF THE DRAWINGS

In the course of the detailed description to follow, reference will be made to the attached drawings. These drawings show different aspects of the present invention and, where appropriate, reference numerals illustrating like structures, components and/or elements in different figures are labeled similarly. It is understood that various combinations of the structures, components and/or elements other than those specifically illustrated are contemplated and within the scope of the present invention.

DETAILED DESCRIPTION

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the scope of the present invention. The following description is, therefore, not to be taken in a limiting sense, and the scope of the present invention is defined by the appended claims.

Throughout the specification and claims, the following terms take the meanings explicitly associated herein, unless the context clearly dictates otherwise. The term "connected" means a direct connection between the items connected, without any intermediate devices. The term "coupled" means either a direct connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "module" means a circuit (whether integrated or otherwise), a group of such circuits, a processor, a processor implementing software, or a combination of a circuit (whether integrated or otherwise), a group of such circuits, a processor and/or a processor implementing software.

Figure 1:
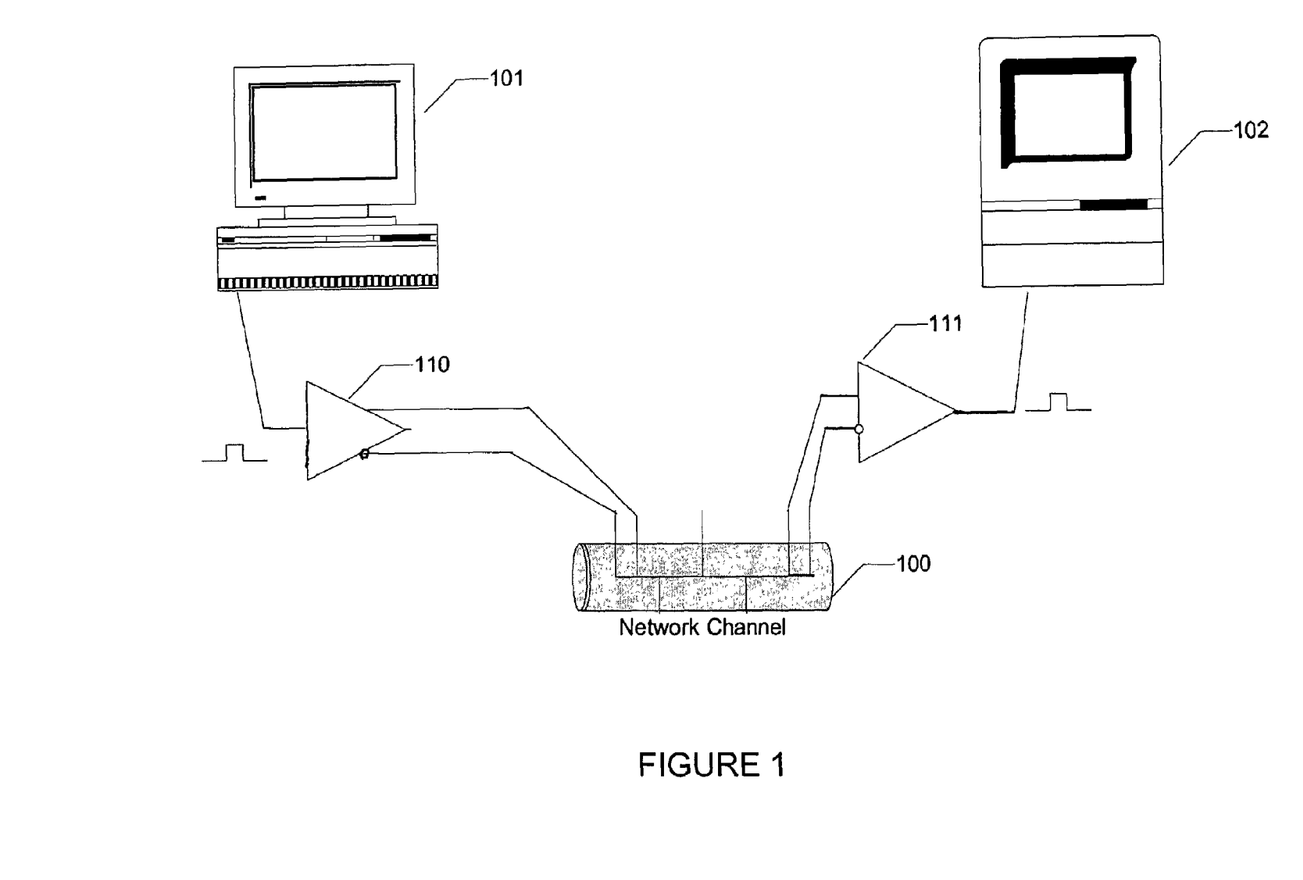
FIG. 1 illustrates an exemplary communications channel between two digital processing devices in accordance with one embodiment of the present invention.

FIG. 1 illustrates an exemplary communications channel between two digital processing devices according to one embodiment of the present invention. Digital processing devices 101 and 102, such as personal computers, communicate with each other by transmitting digital signals through communications channel 100. In one embodiment, a digital representation of the data to be transmitted is encoded and transformed into an electronic signal capable of passing through communications channel 100. The electronic signal is transmitted by transmitter module 110 to receiver module 111. The received electronic signal, which may be distorted with respect to the electronic signal transmitted into or onto the channel by transmitter 110, is processed and decoded by receiver 111 to reconstruct a digital representation of the transmitted information.

The communications channel 100 may be, for example, constructed using one or more cables, wires, traces or the like, or may be part of a system backplane, or may be a wireless communications medium through which the signal passes from transmitter 110 to receiver 111. One skilled in the art will recognize that any such communications media, when used in conjunction with a corresponding transmitter/receiver pair appropriate for a particular medium, may be used to construct a communications channel in accordance with the present invention. For example, other channels that may be implemented in the present invention include electronic, optical or wireless. Indeed, all types of channels of communication (i.e., communication channels), whether now known or later developed, are intended to be within the scope of the present invention.

Figure 2:
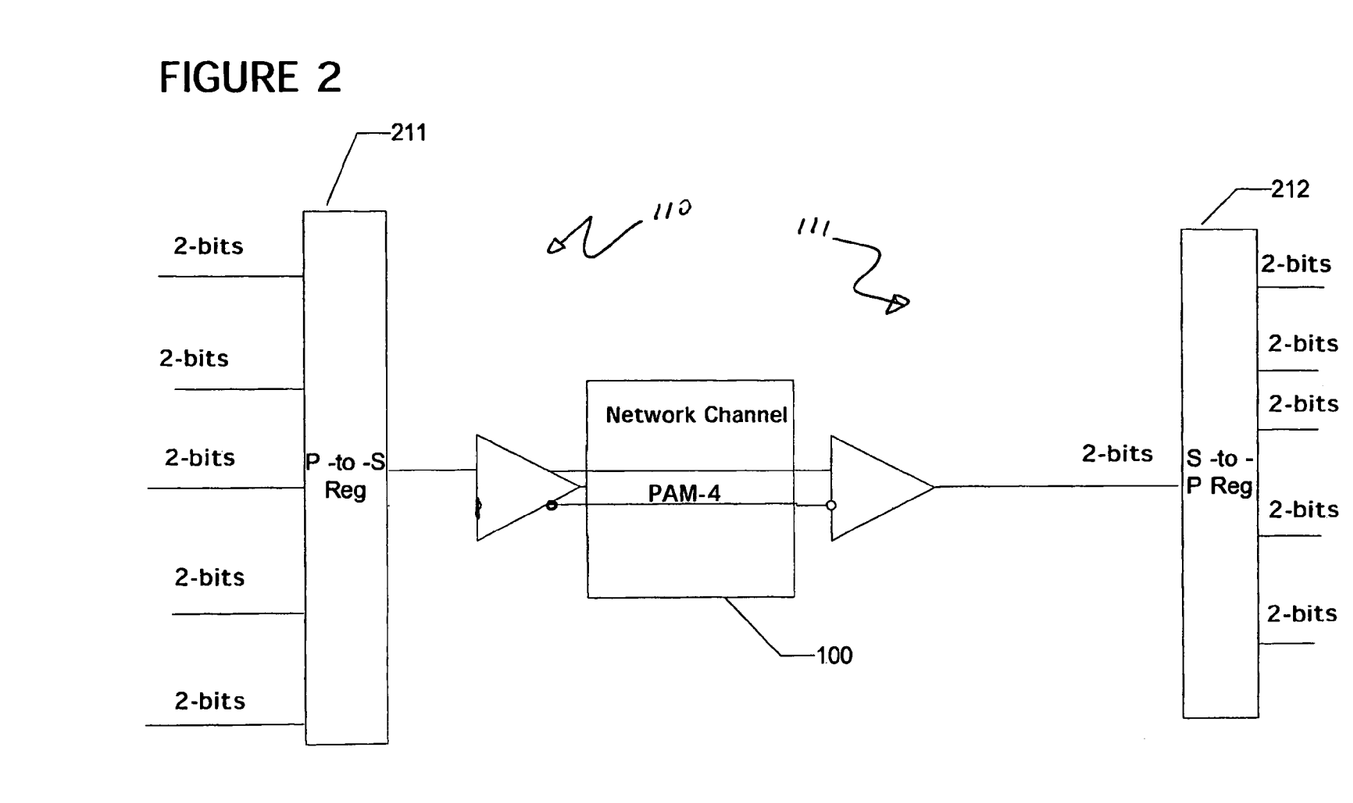
FIG. 2 illustrates an exemplary communications channel and portion of a transmitter/receiver module pair operating in accordance with one embodiment of the present invention.

FIG. 2 illustrates an exemplary communications channel according to one embodiment of the present invention. The communications channel 100 enables or facilitates transmission of information between associated pairs of transmitters and receivers, for example, transmitter 110 and receiver 111. In one embodiment, transmitter 110 and receiver 111 employ a four level pulse amplitude modulated (PAM-4) communications technique to send two bits of data through channel 100. That is, the transmitter/receiver pair is used to send two bits of data for each symbol transmitted through the channel 100. A ten bit word is loaded into parallel-to-serial register 211 with the output of the register being a two bit pair that is transmitted through channel 100. Once received, the sequence of two bit codes are loaded into serial-to-parallel register 212 to reconstruct or decode the ten bit word.

In this particular embodiment, the transmitter and receiver pair employs a PAM-4 communications technique to send the two bits of data through channel 100. Each transmitter and receiver pair operates in the same manner; that is, each pair sends data through the channel in a serial fashion that packages two bits into one symbol. Five successive symbols are associated with each eight bit data byte. The additional overhead associated with this form of encoding is used to ensure adequate symbol crossings, necessary for timing recovery, and to provide DC balance on the line.

In addition, that overhead may also be used to transmit control information for controlling or modifying certain modules or circuitry of the communications system, for example an adaptive equalizer in a transmitter. Thus, control information is that data which is used to control, modify, adjust, enhance, optimize, and/or initialize or re-initialize the operation, performance or function of various components or modules of the transceivers, receivers and transmitters of the system that are coupled via communications channel 100. The adaptive equalizer in the transmitter is one such component or module.

Although the present invention is described in the context of PAM-4 signaling techniques, the present invention may utilize other modulation formats that encode fewer or more bits per symbol codes based on other than byte wide user may be readily adapted or employed. Moreover, other communications mechanisms that use different encoding tables, other than four levels, or use other modulation mechanisms may also be used. For example, PAM-5, PAM-8, PAM-16, CAP, wavelet modulation and other encoding rates such as 16B9Q or 9B5Q (among others) could be utilized. In this regard, the techniques described herein are in fact applicable to any and all modulation schemes, including but not limited to, PAM-4 encoding described herein.

Figure 3:
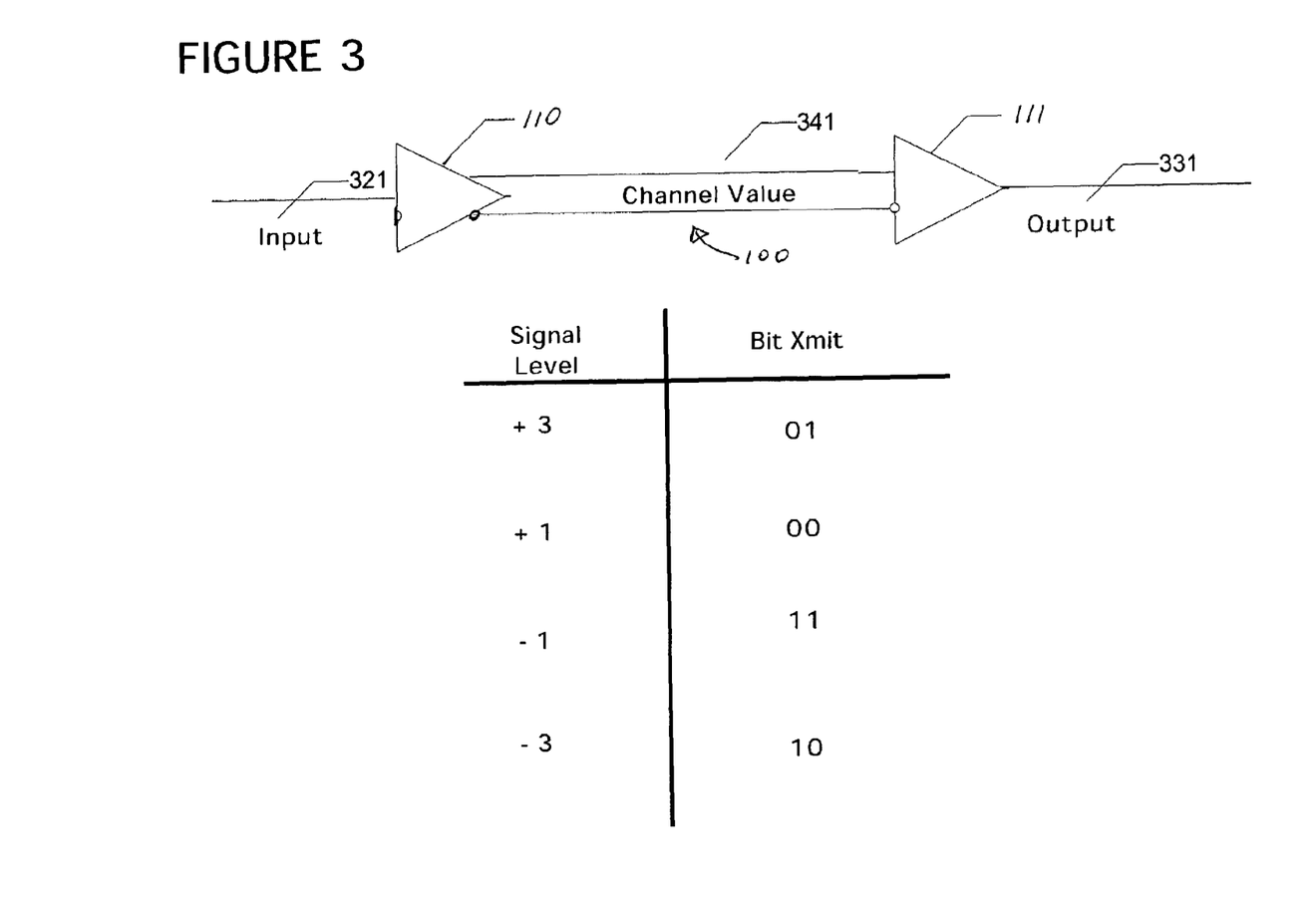
FIG. 3 illustrates a single line of a communications channel, together with a transmitter/receiver pair, employing PAM-4 symbol encoding.

With reference to FIG. 3, in one aspect of the present invention, the communications technique transmits one of four signal values from transmitter 110 to receiver 111. The "value" or level of the signal represents a single communications symbol. The four signal values are used to encode the four possible combinations of values for two bits of digital data.

In operation, as mentioned above, the data is sent (by transmitter 110) through the communications channel by sending a sequence of symbols wherein each symbol is representative of two bits of data. The data on channel 100 (i.e., channel value 341) is received and measured by receiver 111, separated into two bit groups that are reconstructed as output data 331 to allow the digital representation of data input into channel 100 (i.e., input data 321) to be extracted as output data 331 from channel 100.

The communications channel 100 typically includes many sets of unidirectional transmitter and receiver pairs. These pairs tend to continuously and, simultaneously transmit data across the channel in both directions. Thus, from a system level perspective, there are many such transmitter/receiver pairs in continuous and simultaneous operation, for example, 8 or 9 transmitter/receiver pairs, communicating across the channel.

Figure 4:
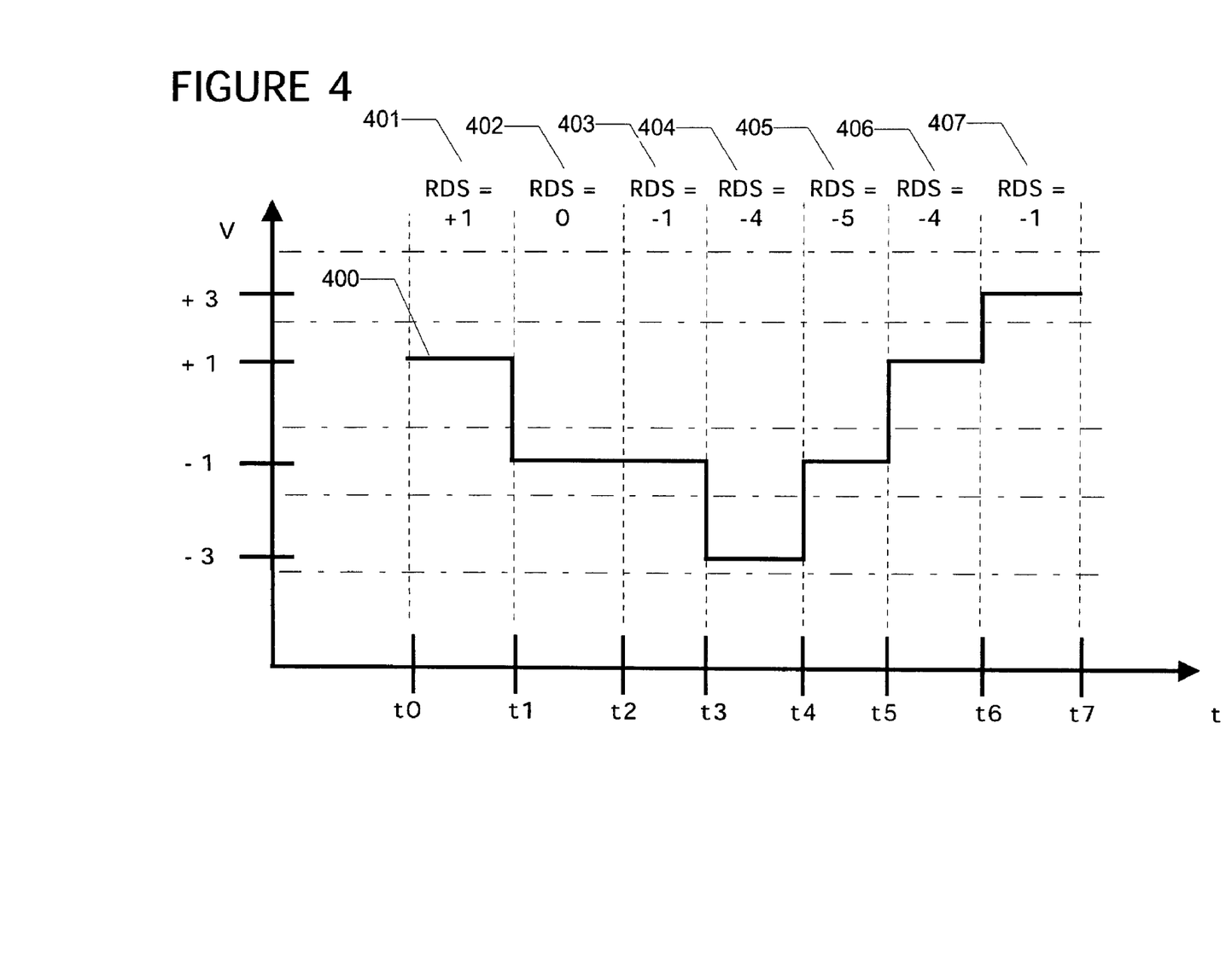
FIG. 4 illustrates a sequence of running digital sum values corresponding to an idealized time-varying communications signal of a single line from a communications channel according to one embodiment of the present invention.

FIG. 4 illustrates a sequence of running digital sum (RDS) values corresponding to an idealized time-varying communications signal for a communications channel. A sequence of seven symbol time periods 401-407 is shown in this example. During each symbol time period 401-407, one of four signal levels (i.e., +3, +1, −1, and −3) is transmitted. The RDS is set forth above the idealized waveform, and, in one aspect of the present invention, is used to estimate the DC balance of the line. The system and techniques for controlling the DC balance of the line through coding, in accordance with the present invention, is described in more detail below.

Figure 5:
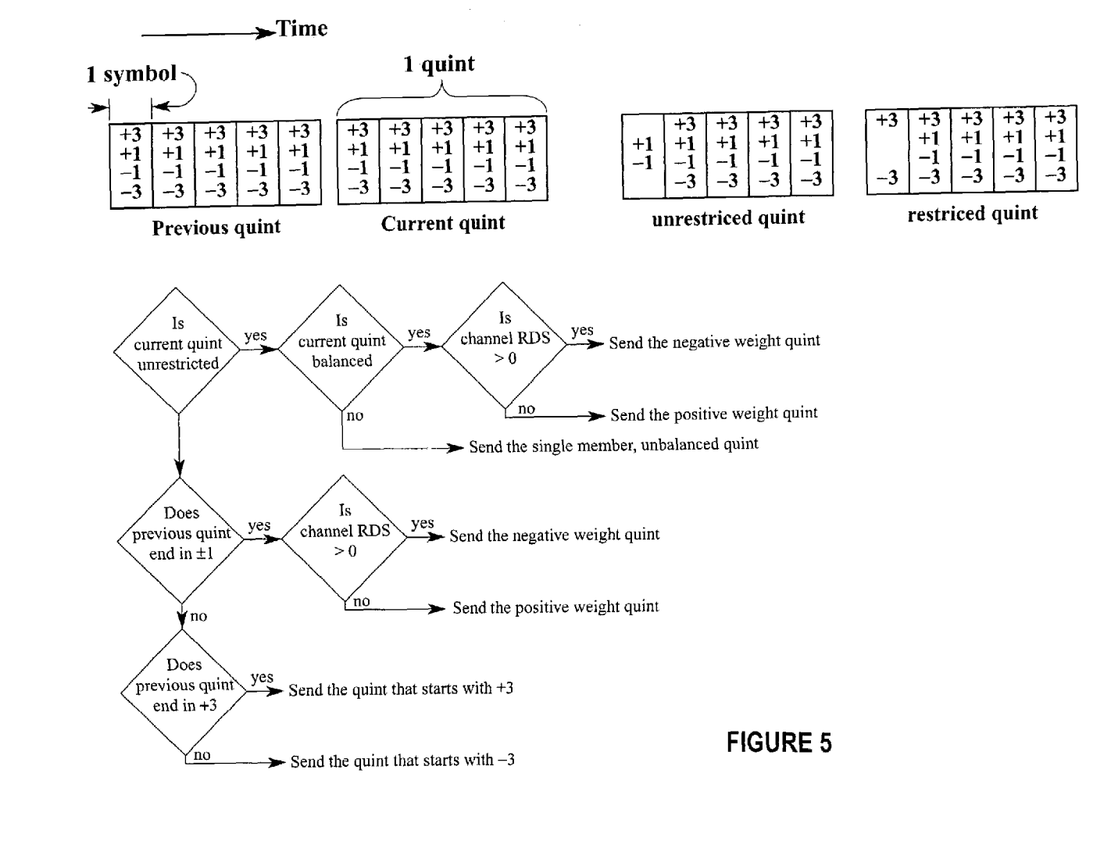
FIG. 5 illustrates a decisional flow chart, according to one aspect of the present invention, of selecting Q Codes for transmission.

FIG. 5 illustrates, among other things, an encoding technique or algorithm according to one embodiment of the present invention. In one embodiment of this encoding technique or algorithm, transitions between the two most extreme signal levels (for example, +3 and −3) are eliminated from the encoded sequences. This transition elimination may be accomplished by simply eliminating all Q Codes that contain this extreme sequence. The final extreme transition (which could occur at the boundary between two successive Q Codes if for example, one Q Code ends in a +3 symbol and the next Q Code starts in a −3 symbol), may be eliminated using a number of different techniques, for example, through either state dependent coding or by fiat if the code space eliminates all Q Codes which either end or begin in one of the most extreme signal levels (+3 or −3, when signal levels are designated as one of {+3, +1, −1, −3}).

By employing an encoding technique as described above, there is a reduction in the code space because arbitrary concatenation of code words will not produce sequences that contain a transition from +3 to −3 or from −3 to +3. This encoding technique reduces by a factor of ⅔ the maximum step size between adjacent symbols in the coded sequences. However, in the frequency domain, this result corresponds to a reduction in high frequency energy. As the higher frequency component of the signal is most subject to crosstalk and reflection mechanisms, the encoding technique according to this aspect of the invention may provide a substantial reduction in crosstalk and problematic reflections (for example, reflections that may not be easily equalized) relative to conventional PAM-n encoding techniques.

In addition, an encoding technique according to this aspect of the invention eliminates, reduces, minimizes or limits transitions between extreme amplitude levels (for example, +3 to −3). Such transitions typically produce the largest signal slopes and curvatures. Eliminating, reducing, minimizing or limiting such transitions tends to reduce errors in sampling times (jitter) and, as such, the Bit Error Rate (BER) may be improved.

In another aspect, the present invention addresses what is often referred to as "baseline wander." "Baseline wander" may be described as a slowly varying shift in the baseline, or low frequency content, of the transmitted signal(s).

The present invention addresses baseline wander, and its affects, using a "running digital sum" technique (indefinite integral, or RDS from FIG. 4). In one embodiment, the communications system employs a bounded sequence and provides a power spectral density null (or an effective null) at DC using a sequence of symbols. A digital integrator monitors the current RDS to maintain, provide, ensure and/or manage a bounded RDS.

In another embodiment, a pre-scrambler is employed to randomize the data stream and then a partially balanced final code space is used to maintain DC balance. In this embodiment, a subset of the code space is used to transmit data as well as provide, enforce or manage the RDS bound. Selectively choosing one of a pair of balanced code words (which may be of heavy weight as determined by summing the values for the 5 symbols that compose this Q Code or quint) provides or manages the balance necessary to maintain acceptable DC balance.

In operation, each pair consists of a positive weighted code word and a negative weight code word that is the complement of the positive code word (i.e., −1 times the positive code word of the pair). Further, each pair of code words is assigned to a particular user data word such that at the receiver, reception of either the positive or negative codeword results in the same 9-bit decoded, user data word. Thus, in operation, when a user data word is transmitted that has a balanced code representation, the code word with polarity opposing the polarity of the current channel RDS is selected for transmission by the transmitter. At the receiver, the same rules are applied in order to determine or reconstruct the data that was transmitted.

In another embodiment, certain portions of the code space have a complement (i.e., a polarity opposing associated code word) and certain portions do not have a complement (i.e., do not have a polarity opposing code word)). The code words of that code space which has no complement are termed unbalanced code words. Implementing unbalanced codes in a protocol or encoding process permits the code space to span the user space when restrictions imposed upon the coding process would have dictated otherwise. This embodiment may provide a rich solution space due to its statistical RDS bound rather than formal RDS bound.

As mentioned above, in one embodiment, the communications system uses a scrambler to provide or ensure that a probabilistic bound may be on the magnitude of the RDS.

It should be noted that the present invention may be implemented using code word pairs that are exact negatives of each other (absolute complements) or other relationships that are not absolute complements.

Furthermore, in those embodiments that employ unbalanced code words, unbalanced code words may be chosen from among those codes with the smallest absolute Q Code RDS or Q Code weight. Although any code may be an unbalanced code, it may be advantageous to use Q Codes with the lowest absolute weight as unbalanced code words in order control the magnitude of the RDS, for example, to reduce the maximum absolute channel RDS.

A code, based upon state-dependent coding, operating in accordance with the present invention is described below. Although the description to follow pertains to PAM-4, segmented into five symbol Q Codes, the technique is generally applicable to other modulation techniques, for example, modulation schemes with arbitrary block length, in which signal transitions are to be eliminated for the purpose of improved transmission as well as for the implementation of features such as but not limited to a back-channel with no overhead or implication to the normally transmitted data. Furthermore, the techniques to be described are applicable to removing or adding transitions between adjacent symbols, as well as removing or adding transitions across multiple symbols so that the density of a given pattern of transitions be minimized, maximized or controlled.

In one embodiment, the code space consists of five, two bit symbols that form one Q Code. A Q Code therefore represents 10 bits and initially gives a set of 1024 possible phrases. Next, all Q Codes that contain an internal transition from +3 to −3 or −3 to +3 are eliminated. This reduces the space to 634 phrases. The four Q Codes which comprise five +3s, five +1s, five −1s, or five −3s may be maintained as special reserved codes (their general use may corrupt the clock recovery process within the receiver); thus, reducing the space to 630 phrases.

The remaining 630 phrases may be classified into two main groups: 1) unrestricted phrases that start with either +1 or −1, with a total of 354 phrases; and 2) restricted phrases that start with either +3 or −3, with a total of 276 phrases. The unrestricted space possesses the property that it may follow any phrase without generating an extreme +3 to −3 or −3 to +3 transition at the boundary. The restricted space may generate extreme transitions at the boundary in certain situations if not handled properly.

An advantage of the restricted group is that it contains 276 members, or 78% of the unrestricted group. Admitting the restricted and unrestricted groups versus just the unrestricted group into the total space results in a 78% increase in the total space. In one embodiment, two rules may be implemented when incorporating the restricted group into the total space: 1) a simple phrase-state encoding process is employed; and 2) all restricted codes are balanced, meaning that if a Q Code starting with a +3 or a −3 exists for a given 9-bit input user data word, then a second Q Code starting with a −3 or a +3 also is assigned to that 9-bit input user data word.

With reference to FIG. 5, in one embodiment, unrestricted Q Codes may begin with a +1 or −1 and restricted Q Codes begin with +3 or −3. The second through the fifth positions of either type of Q Code may be any of the 4 values: +3, −3, +1, −1.

Alternatively, in another embodiment, unrestricted Q Codes may end with a +1 or −1 and restricted Q Codes end with +3 or −3. The first through the fourth positions of either type of Q Code may be any of the 4 values: +3, −3, +1, −1.

With continued reference to FIG. 5, the algorithm may be implemented using a three state memory element to store whether or not the last transmitted phrase ended in a +3, −3. If the phrase to be sent is a member of the unrestricted group, and it is balanced, then the member to be sent shall be the one that drives the channel RDS towards zero. However, if the phrase to be sent is a member of the unrestricted group, and it is unbalanced, then the single member mapping is sent, independent of the channel RDS.

In those situations where the phrase to be sent is a member of the restricted group: if the three state memory indicates that the last transmitted phase did not end in either a +3 or −3, then the member to be sent shall be the one that drives the channel RDS towards zero; in contrast, if the three state memory indicates that the last transmitted phrase ended in a +3, then the member to be sent will be the one beginning with a +3; finally, if the three state memory indicates that the last transmitted phrase ended in a −3, then the member to be sent will be the one beginning with a −3.

In one embodiment, all restricted phrases are removed. This may simplify the architecture required for phrase-state dependent coding. However, this may create inferior channel characteristics due to the reduction in the allowable code space. That is, eliminating restricted phrases limits the phrase space from 630 to 354. Moreover, this restricted phrase embodiment eliminates the need to monitor the last transmitted phrase because members now begin with a +1 or −1 since the process does not generate an extreme transition of +3 to −3 or −3 to +3.

In one embodiment, the code space is bounded with no more than 630 phrases. The assignment of phrases to 9-bit input user data words is not unique but should posses certain characteristics. One of the most important characteristics being that the total code space span the entire user data space S plus control space C. Continuing on with the arguments presented, S=256 and C is minimally 6. Since 630>256+6, the code space clearly spans the input space.

At this point, the channel RDS will be minimized first by minimizing the absolute weight of any code, and then by balancing as many codes as is possible. It should be noted that in a PAM-4 system, or similar odd numbered symbol blocks, there may be advantages to the weight of any given code not being zero (or any even number). By appealing to a statistical balance, such problems of non-zero code weights may be tolerated while still maintaining a bound on the channel RDS. Finally, it may be beneficial to maintain all unbalanced codes to use the smallest absolute code weights, and/or the restricted but balanced codes using the remaining lowest code weights, and/or the unrestricted but balanced codes using the remaining code weights.

As for the assignment of codes to the user space and to the control space, it may be advantageous from the perspective of cost of implementation to impose a restriction on the control space. In those situations where implementation costs are less of a concern, then the entire input space is to be scrambled before coding. However, if S+C is not a power of two, then such a scrambling is complex.

To minimize the cost of scrambling, in one embodiment, the input space is broken or segmented into a user space S that is a power of two (and can be scrambled using a pseudo random binary sequence ("PRBS") generator(s)) and a control space C is not scrambled. The randomizing of transmission of the space C is achieved by ensuring that each control word has multiple Q Code mappings and the choice of which Q Code to transmit is randomly selected by the state of the PRBS generator.

In one preferred embodiment, the C space comprises balanced pairs and the scrambling occurs as follows. First, the most significant bit ("MSB") of the PRBS generator is passed through a modulo-two counter. Then a code from the C space is encountered, the output of the counter is used to select which representation (plus or minus) to transmit. One reason for employing a modulo-two counter to pass either the MSB of the PRBS generator or its complement to the Q Code selection logic is to make the PRBS generator have an even number of states in its repeating pattern.

Generally, PRBS generators have an odd count sequence. Therefore, if sending a constant Q Code for long times, such as during periods of channel idle, there will be a non-zero RDS of the MSB which will cause the channel RDS to become uncontrollably large. By using a count to two counter which is triggered by passing through the start or end sequence of the PRBS, the count becomes balanced and the RDS of the MSB equals zero. This technique ensures or enhances the likelihood that the channel RDS will be statistically balanced.

An exemplary embodiment, which does not employ restricted codes is described in TABLES 1 and 2. In this embodiment, C=6 and all codes for the C space use balanced mappings and are generally chosen from low, absolute weight codes. Space S=256, of which 176 input words use unbalanced codes where the absolute weight is either 1 or 3 (no weight can be zero or any other even number), and the remaining 80 user space inputs are balanced with the remaining codes.

As discussed above, unrestricted codes span 354 phrases. Removing the codes with an absolute weight of 13 codes leaves a total of 352 codes. 80 balanced S codes plus 6 balanced C codes consumes 2(80+6)=172 codes. Add to that the 176 unbalanced S codes gives a total of 176+172=348 codes. That leaves 352−348=4 unused codes for future use.

Figure 6:
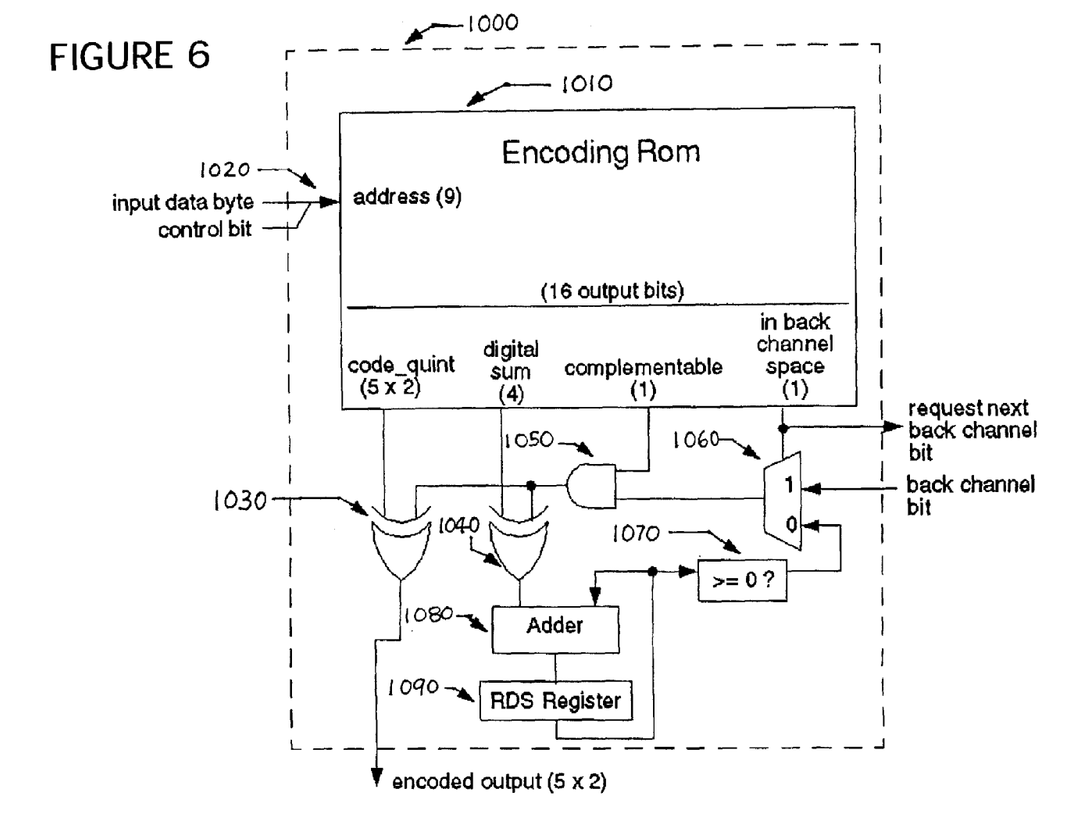
FIG. 6 illustrates an encoding module for a communications system according to one embodiment of the present invention.

One embodiment of an encoding module for a system implementing the above code is illustrated in FIG. 6. In this embodiment, encoder 1000 receives/accepts an input data byte and control bit 1020 are used as the 9-bit address to encoding ROM 1010. The output of the encoding ROM 1010 is segmented into four fields: 10 bits representing a potential codeword, 4 bits representing the digital weight of the codeword, 1 bit indicating whether the word is part of a pair which may be negated (complementable), and 1 bit indicating whether the codeword is one which allows the transmission of a back-channel bit. The encoding ROM's 10 bit (code_quint or Q Code) and 4 bit (digital sum) outputs are connected to negating circuitry 1030 and 1040 respectively, which may negate the inputs based on the output of AND gate 1050. The AND gate 1050 may enable negating circuitry 1030 and 1040 when the encoding ROM's 1 bit (complementable) output and the output of multiplexer 1060 are asserted.

The multiplexer 1060 uses as a select input the 1 bit (in back channel space) output of encoding ROM 1010; that is, when the select is asserted, the output of multiplexer 1060 is determined by the "back channel bit" input; otherwise from the output of digital comparator 1070. Digital comparator 1070 examines the output of RDS register 1090, asserting when the number represented by the RDS register's contents is greater than or equal to zero. The RDS register 1090 is used to hold for one clock cycle the output of adder 1080, and is connected back to one input of adder 1080, forming an integrator. The other input of adder 1080 is connected to the output of negating circuitry 1040.

In the encoder module of FIG. 6, ROM 1010 encodes the input data into a potential code word and word digital sum. The output of ROM 1010 also encodes or determines whether the word is complementable and whether it is in the back channel space. If the word is in the back channel space, it is also considered complementable, and the back channel bit determines whether both the potential codeword and word digital sum dare negated. If the word is not in the back channel space, the polarity of the current RDS integrator output is used to determine whether the potential code word and digital sum word are to be negated (i.e., if the word is considered complementable).

In a decoding module (not illustrated), a 10 bit input obtained from 5 quaternary symbols is used as address to look up an 8 bit data word, 1 bit control designator, 2 bit back channel message output (1 bit is determined by whether word is part of the back channel message space, the other bit for the actual back channel bit). The code assignment for one of the embodiments of the present invention is shown in TABLES 1 and 2 shown below.

TABLE 1

8B5QSMB Code Assignment

| Decimal Code | Q Code RDS > 0 | Q Code RDS < 0 | Decimal Code | Q Code RDS > 0 | Q Code RDS < 0 | Decimal Code | Q Code RDS > 0 | Q Code RDS < 0 |
|---|---|---|---|---|---|---|---|---|
| Back Channel Code | | | 85 | -3-1 3 1 1 | | 171 | -1-1 1 3 1 | |
| 1 | -3-1 1 3 1 | 3 1-1-3-1 | 86 | -3 1 1 1 1 | | 172 | 1-3 1 3 1 | |
| RDS Balancing Codes | | | 87 | | 1 1 1-3-1 | 173 | -1 1-1 3 1 | |
| 2 | -1 1 3 3 1 | 1-1-3-3-1 | 88 | | -1 3 1-3-1 | 174 | 1-1-1 3 1 | |
| 3 | 1-1 3 3 1 | -1 1-3-3-1 | 89 | | 3 1-3-1-1 | 175 | -3 1 3 1 1 | |
| 4 | -1 3 1 3 1 | 1-3-1-3-1 | 90 | | 3-1-1-1-1 | 176 | -1-1 3 1 1 | |
| 5 | 1 1 1 3 1 | -1-1-1-3-1 | 91 | 1-3 1 1 1 | | 177 | -1 1 1 1 1 | |
| 6 | 3-1 1 3 1 | -3 1-1-3-1 | 92 | -1 1-1 1 1 | | 178 | 1-1 1 1 1 | |
| 7 | 1 3-1 3 1 | -1-3 1-3-1 | 93 | 1-1-1 1 1 | | 179 | -1 3-1 1 1 | |
| 8 | 3 1-1 3 1 | -3-1 1-3-1 | 94 | 1 1-3 1 1 | | 180 | 1 1-1 1 1 | |
| 9 | -1 3 3 1 1 | 1-3-3-1-1 | 95 | 3-1-3 1 1 | | 181 | 3-1-1 1 1 | |
| 10 | 1 1 3 1 1 | -1-1-3-1-1 | 96 | -3 1 3-1 1 | | 182 | 3 1-3 1 1 | |
| 11 | 3-1 3 1 1 | -3 1-3-1-1 | 97 | -1-1 3-1 1 | | 183 | -1 1 3-1 1 | |

TABLE 1-continued

8B5QSMB Code Assignment

| Decimal Code | Q Code RDS > 0 | Q Code RDS < 0 | Decimal Code | Q Code RDS > 0 | Q Code RDS < 0 | Decimal Code | Q Code RDS > 0 | Q Code RDS < 0 |
|---|---|---|---|---|---|---|---|---|
| 12 | 1 3 1 1 1 | -1-3-1-1-1 | 98 |  | -1 3-1-1-1 | 184 | 1-1 3-1 1 |  |
| 13 | 3 1 1 1 1 | -3-1-1-1-1 | 99 |  | 1-1 1-1-1 | 185 | -1 3 1-1 1 |  |
| 14 | 3 3-1 1 1 | -3-3 1-1-1 | 100 |  | -1 1 1-1-1 | 186 | 1 1 1-1 1 |  |
| 15 | 1 3 3-1 1 | -1-3-3 1-1 | 101 |  | -1-1 3-1-1 | 187 | 3-1 1-1 1 |  |
| 16 | 3 1 3-1 1 | -3-1-3 1-1 | 102 |  | -3 1 3-1-1 | 188 | 1 3-1-1 1 |  |
| 17 | 3 3 1-1 1 | -3-3-1 1-1 | 103 |  | 3-1-3 1-1 | 189 | 3 1-1-1 1 |  |
| 18 | -1 3 3 3-1 | 1-3-3-3 1 | 104 |  | 1 1-3 1-1 | 190 | 1 3 1-3 1 |  |
| 19 | 1 1 3 3-1 | -1-1-3 3 1 | 105 | -1 3-1-1 1 |  | 191 | 3 1 1-3 1 |  |
| 20 | 3-1 3 3-1 | -3 1-3-3 1 | 106 | 1-3 1 1-1 |  | 192 | 3 3-1-3 1 |  |
| 21 | 1 3 1 3-1 | -1-3-1-3 1 | 107 | 3-1-1-1 1 |  | 193 | -3 1 3 3-1 |  |
| 22 | 3 1 1 3-1 | -3-1-1-3 1 | 108 | 3 1-3-1 1 |  | 194 | -1-1 3 3-1 |  |
| 23 | 3 3-1 3-1 | -3-3 1-3 1 | 109 | -1 3 1-3 1 |  | 195 | -1 1 1 3-1 |  |
| 24 | 1 3 3 1-1 | -1-3-3-1 1 | 110 | 1 1 1-3 1 |  | 196 | 1-1 1 3-1 |  |
| 25 | 3 1 3 1-1 | -3-1-3-1 1 | 111 | 3-1 1-3 1 |  | 197 | -1 3-1 3-1 |  |
| 26 | 3 3 1 1-1 | -3-3-1-1 1 | 112 | 1 3-1-3 1 |  | 198 | 1 1-1 3-1 |  |
| 27 | 3 3 3-1-1 | -3-3-3 1 1 | 113 | 3 1-1-3 1 |  | 199 | 3-1-1 3-1 |  |
| 28 | -1 3 3 3 1 | 1-3-3-3-1 | 114 | -3-1 3 3-1 |  | 200 | -1 1 3 1-1 |  |
| 29 | 1 1 3 3 1 | -1-1-3-3-1 | 115 | -3 1 1 3-1 |  | 201 | 1-1 3 1-1 |  |
| 30 | 3-1 3 3 1 | -3 1-3-3-1 | 116 | -1-1 1 3-1 |  | 202 | -1 3 1 1-1 |  |
| 31 | 1 3 1 3 1 | -1-3-1-3-1 | 117 | 1-3 1 3-1 |  | 203 | 1 1 1 1-1 |  |
| 32 | 3 1 1 3 1 | -3-1-1-3-1 | 118 | -1-1 1 3-1 |  | 204 | 3-1 1 1-1 |  |
| 33 | 3 3-1 3 1 | -3-3 1-3-1 | 119 | 1-1-1 3-1 |  | 205 | 1 3-1 1-1 |  |
| 34 | 1 3 3 1 1 | -1-3-3-1-1 | 120 | -3 1 3 1-1 |  | 206 |  | 3 1-3-3-1 |
| 35 | 3 1 3 1 1 | -3-1-3-1-1 | 121 | -1-1 3 1-1 |  | 207 |  | 3-1-1-3-1 |
| 36 | 3 3 1 1 1 | -3-3-1-1-1 | 122 | -1 1 1 1-1 |  | 208 |  | 1 1-1-3-1 |
| 37 | 3 3 3-1 1 | -3-3-3 1-1 | 123 | 1-1 1 1-1 |  | 209 |  | -1 3-1-3-1 |
| 38 | 1 3 3 3-1 | -1-3-3-3 1 | 124 | -1 3-1 1-1 |  | 210 |  | 1-1 1-3-1 |
| 39 | 3 1 3 3-1 | -3-1-3-3 1 | 125 | 1 1-1 1-1 |  | 211 |  | -1 1 1-3-1 |
| 40 | 3 3 1 3-1 | -3-3-1-3 1 | 126 | 3-1-1 1-1 |  | 212 |  | 3-1-3-1-1 |
| 41 | 3 3 3 1-1 | -3-3-3-1 1 | 127 | 3 1-3 1-1 |  | 213 |  | 1 1-3-1-1 |
| 42 | 1 3 3 3 1 | -1-3-3-3-1 | 128 | -1 1 3-1-1 |  | 214 |  | 1-1-1-1-1 |
| 43 | 3 1 3 3 1 | -3-1-3-3-1 | 129 | 1-1 3-1-1 |  | 215 |  | -1 1-1-1-1 |
| 44 | 3 3 1 3 1 | -3-3-1-3-1 | 130 | -1 3 1-1-1 |  | 216 |  | 1-3 1-1-1 |
| 45 | 3 3 3 1 1 | -3-3-3-1-1 | 131 | 1 1 1-1-1 |  | 217 |  | -1-1 1-1-1 |
| 46 | -3 1 3 3 1 | 3 1-3-3-1 | 132 | 3-1 1-1-1 |  | 218 |  | -3 1 1-1-1 |
| 47 | -1-1 3 3 1 | 1 1-3-3-1 | 133 | 1 3-1-1-1 |  | 219 |  | -3-1 3-1-1 |
| 48 | -1 1 1 3 1 | 1-1-1-3-1 | 134 | 3 1-1-1-1 |  | 220 |  | 1-1-3 1-1 |
| 49 | 1-1 1 3 1 | -1 1-1-3-1 | 135 | 1 3 1-3-1 |  | 221 |  | -1 1-3 1-1 |
| 50 | -1 3-1 3 1 | 1-3 1-3-1 | 136 | 3 1 1-3-1 |  | 222 |  | 1-3-1 1-1 |
| 51 | 1 1-1 3 1 | -1-1 1-3-1 | 137 | 3 3-1-3-1 |  | 223 |  | -1-1-1 1-1 |
| 52 | 3-1-1 3 1 | -3 1 1-3-1 | 138 |  | -3 1 1 1-1 | 224 |  | -3 1-1 1-1 |
| 53 | -1 1 3 1 1 | 1-1-3-1-1 | 139 |  | -3-1 3 1-1 | 225 |  | -1-3 1 1-1 |
| 54 | 1-1 3 1 1 | -1 1-3-1-1 | 140 |  | 1-3-1 3-1 | 226 |  | -3-1 1 1-1 |
| 55 | -1 3 1 1 1 | 1-3-1-1-1 | 141 |  | -1-1-1 3-1 | 227 |  | -1-3 3 3-1 |
| 56 | 3-1 1 1 1 | -3 1-1-1-1 | 142 |  | -3 1-1 3-1 | 228 |  | -3-1 1 3-1 |
| 57 | 1 3-1 1 1 | -1-3 1-1-1 | 143 |  | -1-3 1 3-1 | 229 |  | -3-3 1 3-1 |
| 58 | 3 1-1 1 1 | -3-1 1-1-1 | 144 |  | -3-1 1 3-1 | 230 |  | 3-1-3 3 1 |
| 59 | -1 3 3-1 1 | 1-3-3 1-1 | 145 |  | 3 1-3-3 1 | 231 |  | 1 1-3-3 1 |
| 60 | 1 1 3-1 1 | -1-1-3 1-1 | 146 |  | 3-1-1-3 1 | 232 |  | 1-1-1-3 1 |
| 61 | 3-1 3-1 1 | -3 1-3 1-1 | 147 |  | 1 1-1-3 1 | 233 |  | -1 1-1-3 1 |
| 62 | 1 3 1-1 1 | -1-3-1 1-1 | 148 |  | -1 3-1-3 1 | 234 |  | 1-3 1-3 1 |
| 63 | 3 1 1-1 1 | -3-1-1 1-1 | 149 |  | 1-1 1-3 1 | 235 |  | 1-1 1-3 1 |
| 64 | 3 3-1-1 1 | -3-3 1 1-1 | 150 |  | -1 1 1-3 1 | 236 |  | -3 1 1-3 1 |
| 65 | 3 3 1-3 1 | -3-3-1 3-1 | 151 |  | 3-1-3-1 1 | 237 |  | 1-1-3 1 1 |
| 66 | -1 1 3 3-1 | 1-1-3-3 1 | 152 |  | 1 1-3-1 1 | 238 |  | -1 1-3 1 1 |
| 67 | 1-1 3 3-1 | -1 1-3-3 1 | 153 |  | 1-1-1-1 1 | 239 |  | 1-3-1 1 1 |
| 68 | -1 3 1 3-1 | 1-3-1-3 1 | 154 |  | -1 1-1-1 1 | 240 |  | -1-1-1 1 1 |
| 69 | 1 1 1 3-1 | -1-1-1-3 1 | 155 |  | 1-3 1-1 1 | 241 |  | 3 1-1-1 1 |
| 70 | 3-1 1 3-1 | -3 1-1-3 1 | 156 |  | -1-1 1-1 1 | 242 |  | -1 3 1-1 1 |
| 71 | 1 3-1 3-1 | -1-3 1-3 1 | 157 |  | -3 1 1-1 1 | 243 | -1 3 3-1-1 |  |
| 72 | 3 1-1 3-1 | -3-1 1-3 1 | 158 |  | -3-1 1-1 1 | 244 | 1 1 3-1-1 |  |
| 73 | -1 3 3 1-1 | 1-3-3-1 1 | 159 |  | 1-1 3-1 1 | 245 | 3-1 3-1-1 |  |
| 74 | 1 1 3 1-1 | -1-1-3-1 1 | 160 |  | -1 1 3-1 1 | 246 | 1 3 1-1-1 |  |
| 75 | 3-1 3 1-1 | -3 1-3-1 1 | 161 |  | 1-3-1 1 1 | 247 | 3 1 1-1-1 |  |
| 76 | 1 3 1 1-1 | -1-3-1-1 1 | 162 |  | -1-1-1 1 1 | 248 | 3 3-1-1-1 |  |
| 77 | 3 1 1 1-1 | -3-1-1-1 1 | 163 |  | -3 1-1 1 1 | 249 | 3 3 1-3-1 |  |
| 78 | 3 3-1 1-1 | -3-3 1-1 1 | 164 |  | -1-3 1 1 1 | 250 |  | 1-3-3 1 1 |
| 79 | 1 3 3-1-1 | -1-3-3 1 1 | 165 |  | -3-1 1 1 1 | 251 |  | -1-1-3 1 1 |
| 80 | 3 1 3-1-1 | -3-1-3 1 1 | 166 |  | -1-3 1 3 1 | 252 |  | -3 1-3 1 1 |
| 81 | -1-3 1 3 1 |  | 167 |  | -3-1 1 3 1 | 253 |  | -1-3-1 1 1 |
| 82 |  | 1 3-1-3-1 | 168 |  | -3-3 1 3 1 | 254 |  | -3-1-1 1 1 |
| 83 | -1-1-1 3 1 |  | 169 | -3-1 3 3 1 |  | 255 |  | -3-3 1 1 1 |
| 84 | 1-3-1 3 1 |  | 170 | -3 1 1 3 1 |  | 256 |  | -3-3-1 3 1 |

TABLE 2

Special Characters ("K" Codes) and Supported "K" Codes

Special Characters

| Code | Description | Binary Value <7:0> | Q4<1:0> -Q0<1:0> | |
|---|---|---|---|---|
| | | | Q Code RDS > 0 | Q Code RDS < 0 |
| K 28.0 | Skip (aka Idle, aka ‖R‖) | 0 0 0 1 1 1 0 0 | -3 1-1 3 1 | 3-1 1-3-1 |
| K 28.5 | Sync (aka Idle, aka ‖K‖) | 1 0 1 1 1 1 0 0 | -1-1 1 1 1 | 1 1-1-1-1 |
| K 27.7 | Start | 1 1 1 1 1 0 1 1 | -1 1 1-1 1 | 1-1-1 1-1 |
| K 29.7 | Terminate | 1 1 1 1 1 1 0 1 | 1-1 1-1 1 | -1 1-1 1-1 |
| K 30.7 | Error | 1 1 1 1 1 1 1 0 | 1 1-1-1 1 | -1-1 1 1-1 |
| Accelerant Control Codes | | | | |
| SI-K 23.7 | | 1 1 1 1 0 1 1 1 | 3 3 3 3-1 | -3-3-3-3 1 |
| Error | | 1 1 1 1 1 1 1 1 | -1-1-1-1-1 | 1 1 1 1 1 |

FIG. 1 illustrates an exemplary operating environment in which the present invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments and data communication systems that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed. All such combinations or distributions, whether now known or later developed, are within the scope of the present invention.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes backplanes which are composed of many layers of conducting material separated by insulating layers, wired media such as a wired network or direct-wired connection, and wireless media such as acoustic, RF, infrared and other wireless media. Combinations of any of the above should also be included within the scope of communication media.

Additionally, the embodiments described herein may be implemented (in part) as logical operations performed by programmable processing devices. The logical operations of these various embodiments of the present invention are implemented (1) as a sequence of computer implemented steps or program modules running on a computing system and/or (2) as interconnected machine modules or hardware logic within the computing system. Accordingly, the logical operations making up the embodiments of the invention described herein can be variously referred to as operations, steps, or modules.

While the above embodiments of the present invention describe a system and method for encoding and decoding digital communications data, one skilled in the art will recognize that the use of the specific encoding and Q Codes are exemplary embodiments of the present invention. The present invention is suitable where the encoding is performed in a manner that utilizes multiple codes for a subset of the symbols. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method, apparatus, and article of manufacture for encoding and decoding digital communications data.

What is claimed is:

1. A method of encoding a first n-bit data word for transmission in a communications system, the communications system including a transmitter, a receiver, a communications channel and a first subset of n-bit data words, wherein each data word of the first subset is assigned a unique subset of one or more coded data words, the method comprising:

determining a second n-bit data word, of the first subset of n-bit data words, that corresponds to the first n-bit data word;

selecting a first coded data word, from a unique subset of coded data words associated with the second n-bit data word;

providing the first coded data word for transmission over the communications channel as one or more multi-level symbols;

wherein a code space, formed by combining each unique subset of coded data words associated with each data word of the first subset of n-bit data words, excludes any coded data word that has a transition from a maximum value symbol to a minimum value symbol and excludes any coded data word that has a transition from the minimum value symbol to the maximum value symbol; and wherein the first coded data word is selected to minimize an absolute value of an RDS, unless a selection would produce a transition, with respect to a boundary symbol of another coded data word, that is between a maximum level and a minimum level.

2. The method according to claim 1, wherein the code space excludes all coded data words having a maximum value symbol as a boundary symbol.

3. The method according to claim 1, wherein the code space excludes all coded data words having a minimum value symbol as a boundary symbol.

4. The method according to claim 1, wherein a unique subset, for an n-bit data word of the first subset of n-bit data words, is assigned a coded data word having a maximum value symbol as a boundary symbol and a coded word having a non-maximum value symbol as a boundary symbol.

5. The method according to claim 1 wherein a unique subset, for an n-bit data word of the first subset of n-bit data words, is assigned a coded data word having a minimum value symbol as a boundary symbol and a coded word having a non-minimum value symbol as a boundary symbol.

6. The method of claim 1, further comprising:
scrambling the first n-bit data word, prior to using the first n-bit data word to determine the second n-bit data word.

7. The method of claim 1, wherein each unique subset with a plurality of coded data words has at least two coded data words with different weights.

8. A system for encoding a first n-bit data word for transmission in a communications system, the communications system including a transmitter, a receiver, a communications channel and a first subset of n-bit data words, wherein each data word of the first subset is assigned a unique subset of one or more coded data words, the method comprising:

a subsystem configured for determining a second n-bit data word, of the first subset of n-bit data words, that corresponds to the first n-bit data word;

a subsystem configured for selecting a first coded data word, from a unique subset of coded data words associated with the second n-bit data word;

a subsystem configured for providing the first coded data word for transmission over the communications channel as one or more multi-level symbols;

wherein a code space, formed by combining each unique subset of coded data words associated with each data word of the first subset of n-bit data words, excludes any coded data word that has a transition from a maximum value symbol to a minimum value symbol and excludes any coded data word that has a transition from the minimum value symbol to the maximum value symbol; and wherein the first coded data word is selected to minimize an absolute value of an RDS, unless a selection would produce a transition, with respect to a boundary symbol of another coded data word, that is between a maximum level and a minimum level.

9. The system of claim 8, wherein the code space excludes all coded data words having a maximum value symbol as a boundary symbol.

10. The system of claim 8, wherein the code space excludes all coded data words having a minimum value symbol as a boundary symbol.

11. The system of claim 8, wherein a unique subset, for an n-bit data word of the first subset of n-bit data words, is assigned a coded data word having a maximum value symbol as a boundary symbol and a coded word having a non-maximum value symbol as a boundary symbol.

12. The system of claim 8 wherein a unique subset, for an n-bit data word of the first subset of n-bit data words, is assigned a coded data word having a minimum value symbol as a boundary symbol and a coded word having a non-minimum value symbol as a boundary symbol.

13. The system of claim 8, further comprising:
a subsystem configured for scrambling the first n-bit data word, prior to using the first n-bit data word to determine the second n-bit data word.

14. The system of claim 8, wherein each unique subset with a plurality of coded data words has at least two coded data words with 3 different weights.

* * * * *

UNITED STATES PATENT AND TRADEMARK OFFICE
CERTIFICATE OF CORRECTION

| | | |
|---|---|---|
| PATENT NO. | : 7,260,155 B2 | Page 1 of 1 |
| APPLICATION NO. | : 10/222254 | |
| DATED | : August 21, 2007 | |
| INVENTOR(S) | : John T. Stonick et al. | |

It is certified that error appears in the above-identified patent and that said Letters Patent is hereby corrected as shown below:

In claim 14 (at column 16, line 42), please delete the figure "3" so that the phrase reads --two coded data words with different weights.--

Signed and Sealed this

Twenty-seventh Day of November, 2007

JON W. DUDAS
*Director of the United States Patent and Trademark Office*